(12) United States Patent
Cambon et al.

(10) Patent No.: US 11,028,275 B2
(45) Date of Patent: Jun. 8, 2021

(54) DEVELOPMENT OF A SOL-GEL ANTICORROSION TREATMENT

(71) Applicants: SAFRAN, Paris (FR); RBNANO, Strasbourg (FR); SAFRAN LANDING SYSTEMS, Velizy Villacoublay (FR)

(72) Inventors: Jean-Baptiste Cambon, Moissy-Cramayel (FR); Julien Esteban, Strasbourg (FR); Roland Rodrigue Mafouana, Strasbourg (FR); Jean-Philippe Ruetsch, Walheim (FR)

(73) Assignees: SAFRAN, Paris (FR); RBNANO, Strasbourg (FR); SAFRAN LANDING SYSTEMS, Velizy Villacoublay (FR)

( * ) Notice: Subject to any disclaimer, the term of this patent is extended or adjusted under 35 U.S.C. 154(b) by 170 days.

(21) Appl. No.: 16/076,508

(22) PCT Filed: Feb. 9, 2017

(86) PCT No.: PCT/FR2017/050301
§ 371 (c)(1),
(2) Date: Aug. 8, 2018

(87) PCT Pub. No.: WO2017/137704
PCT Pub. Date: Aug. 17, 2017

(65) Prior Publication Data
US 2019/0085175 A1 Mar. 21, 2019

(30) Foreign Application Priority Data
Feb. 9, 2016 (FR) ...................................... 1650995

(51) Int. Cl.
| | | |
|---|---|---|
| C09D 5/08 | (2006.01) | |
| C09D 7/20 | (2018.01) | |
| C09D 7/43 | (2018.01) | |
| C23C 26/00 | (2006.01) | |
| B05D 7/14 | (2006.01) | |
| C08K 3/04 | (2006.01) | |
| C09D 7/40 | (2018.01) | |
| C23C 18/12 | (2006.01) | |
| C09D 7/61 | (2018.01) | |
| C09D 139/06 | (2006.01) | |
| C08K 3/08 | (2006.01) | |
| C08K 5/5435 | (2006.01) | |

(52) U.S. Cl.
CPC .............. *C09D 5/084* (2013.01); *B05D 7/14* (2013.01); *C09D 5/08* (2013.01); *C09D 7/20* (2018.01); *C09D 7/43* (2018.01); *C09D 7/61* (2018.01); *C09D 7/70* (2018.01); *C09D 139/06* (2013.01); *C23C 18/122* (2013.01); *C23C 18/127* (2013.01); *C23C 18/1241* (2013.01); *C23C 18/1254* (2013.01); *C23C 18/1295* (2013.01); *C23C 26/00* (2013.01); *C08K 3/046* (2017.05); *C08K 5/5435* (2013.01); *C08K 2003/085* (2013.01); *C08K 2003/0806* (2013.01); *C08K 2201/001* (2013.01); *C08K 2201/011* (2013.01); *C23C 2222/20* (2013.01)

(58) Field of Classification Search
None
See application file for complete search history.

(56) References Cited

U.S. PATENT DOCUMENTS

| | | | | |
|---|---|---|---|---|
| 5,206,285 A | * | 4/1993 | Castellucci | C08G 77/54 523/421 |
| 2011/0008645 A1 | * | 1/2011 | Schneider | C23C 22/17 428/640 |
| 2013/0177768 A1 | * | 7/2013 | Kruger | C23C 22/44 428/412 |
| 2014/0205845 A1 | * | 7/2014 | Philip, Jr. | H01B 1/22 428/457 |
| 2014/0335275 A1 | | 11/2014 | Ryabova | |

FOREIGN PATENT DOCUMENTS

| | | |
|---|---|---|
| WO | 2006/069376 A2 | 6/2006 |
| WO | 2009/069111 A2 | 6/2009 |

OTHER PUBLICATIONS

Yugang Sun et al., "Crystalline Silver Nanowires by Soft Solution Processing", Nano Letters, Jan. 3, 2002, pp. 165-168, vol. 2, No. 2.
International Search Report for PCT/FR2017/050301, dated May 18, 2017.
French Search Report dated Oct. 10, 2016, issued by the National Institute of Industrial in application No. FR1650995
International Search Report dated May 18, 2017, issued by the International Searching Authority in application No. PCT/FR2017/050301.
Written Opinion dated May 18, 2017, issued by the International Searching Authority in application No. PCT/FR2017/050301.

* cited by examiner

*Primary Examiner* — Sheeba Ahmed
(74) *Attorney, Agent, or Firm* — Sughrue Mion, PLLC

(57) ABSTRACT

The invention relates to a process for treating a metal alloy part, characterized in that it comprises the following steps:
—producing a stock formulation by mixing, in equal molar parts of silicon, an alcoholic solution of hydrolysed epoxysilane and an alcoholic solution of hydrolysed aminosilane,
—mixing the stock formulation with a suspension comprising conductive nanowires in an amount by weight of between 0.1% and 10% relative to the total weight of the stock formulation in order to obtain a dilute formulation, and
—depositing the dilute formulation on the part in order to obtain the coating.

15 Claims, 1 Drawing Sheet

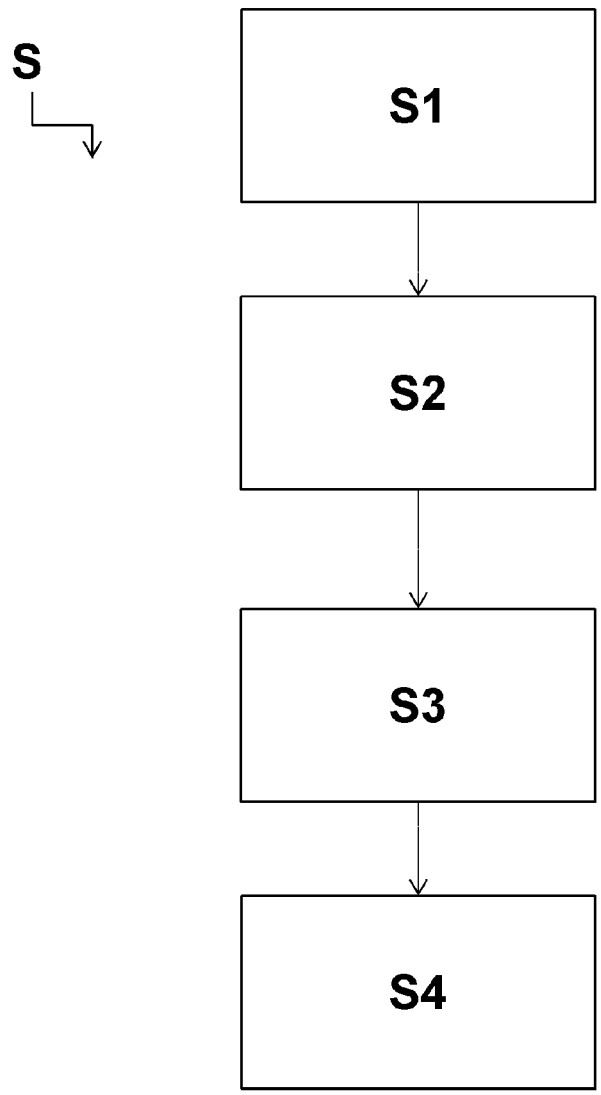

DEVELOPMENT OF A SOL-GEL ANTICORROSION TREATMENT

FIELD OF THE INVENTION

The invention relates to the development of an anticorrosion treatment for metals, such as aluminum, steel or magnesium, as well as their metal alloys.

TECHNOLOGICAL BACKGROUND

Metals and their alloys are widely used in industry, the choice of the type of metal (or alloy) used being made by manufacturers according to the properties (mechanical, thermal, chemical conductive, etc.) sought.

Aluminum, for example, is often used in aeronautics because it has both low density and good mechanical and anticorrosive properties. However, in order to further improve the mechanical strength of aluminum, this metal is generally alloyed with other chemical elements—such as copper (Cu), iron (Fe), zinc (Zn), silicon (Si), etc.—which form hardening precipitates and have the effect of considerably reducing the anticorrosive properties of aluminum.

To overcome this problem, it is known in the aircraft industry in particular to apply protective surface treatments to the surface of aluminum alloy parts. Examples include chemical conversion processes, which are chemical processes adapted to form a layer of complex oxides (generally based on chromates and zirconates) of very small thickness (generally less than a micron) on the surface of an aluminum alloy part. For example, Alodine 1200, the chemical conversion process based on hexavalent chromium, makes it possible to obtain a coating capable of protecting the aluminum alloy against corrosion, with good resistance over time, good conductive properties (essential for ensuring electrical continuity in an aircraft in the event of high discharge) and good adhesion with respect to paints (finishing treatment).

Chemical conversion processes are generally carried out by immersing the part to be treated (fully treated part) or by retouching the part to be treated (local treatment).

In the field of aeronautics, the expected performance characteristics of aluminum alloy parts are as follows:
- good corrosion resistance (i.e., not more than 2.5 pits per square decimeter after exposure to salt spray in accordance with standard ASTM B 117 or ISO 9227 for 168 hours in the case of an immersion process, and for 72 hours in the case of a retouching process);
- good electrical conductivity (i.e., conductivity meeting or exceeding the requirements of standard MIL-DTL-81706);
- paint adhesion to the coating obtained (class 0/1 dry, class 1/2 at most after immersion in fluids);
- resistance to fluids (water, hydraulic fluids, fuel, deicer, solvents, etc.),
- coating obtained is colored or at least visible to the naked eye (color not imposed).

The chemical conversion processes based on hexavalent chromium, such as Alodine 1200, make it possible to form a coating on an aluminum alloy part with very good corrosion resistance and excellent paint adhesion. The coating thus obtained is also self-healing (local retouching) and has bactericidal action and a yellow/gold color which is easily detectable by operators.

These chemical conversion processes thus indeed have the performance characteristics expected of aluminum alloy parts in the field of aeronautics.

However, the treatment of effluents containing hexavalent chromium is very expensive and highly toxic. Furthermore, this treatment does not meet the demands of environmental standards (such as regulation no. 1907/2006) and in all likelihood can no longer be used after 2017.

It has therefore been proposed to implement alternative stripping, anodizing, sealing or chemical conversion processes in order to obtain by other means a coating on a metal part likely to have the expected performance characteristics, notably in the field of aeronautics.

However, it turns out that not one the alternative processes envisaged is universal, i.e., capable of being applied to a large number of metal alloys (in addition to aluminum alloys).

It also turns out that, among the alternative processes considered, only the chemical conversion processes SurTec® 650V and Lanthane 613.3, based on trivalent chromium, are able to produce a colored coating, the other coatings obtained being almost colorless (or even slightly iridescent blue). However, the presence of such a coloring is preferable so as to allow the operators to verify that the coating has been obtained on the entire treated metal part. Furthermore, the SurTec® 650V and Lanthane 613.3 chemical conversion processes provide satisfactory results for 5000 and 6000 series aluminum alloys. However, these processes are not universal and therefore cannot be satisfactorily applied to all series of aluminum alloys or to other metal alloys such as alloys based on magnesium or iron.

Finally, no coating obtained by a chemical conversion process is yet sufficiently robust to meet the salt-spray resistance criterion described above for 2000 and 7000 series high-performance aluminum alloys.

SUMMARY OF THE INVENTION

An objective of the invention is thus to propose a process for treating a part made of a metal alloy that can be applied to a large number of alloys, and in particular to all series of aluminum alloys, to iron alloys and to magnesium alloys, which has good corrosion resistance, good electrical conductivity, good paint adhesion, good fluid resistance and which is also easily visible to the naked eye by an operator.

Preferably, the process should be able to be applied to parts made from bars or sheets or forged parts (1000 to 8000 series), foundry parts (alloy AS7G0.6, etc.), and parts made directly from aluminum alloy.

To this end, the invention proposes a process for treating a metal alloy part, characterized in that it comprises the following steps:
- produce a stock formulation by mixing, in equal molar parts of silicon, an alcoholic solution of hydrolyzed epoxysilane and an alcoholic solution of hydrolyzed aminosilane,
- mix the stock formulation with a suspension comprising conductive nanowires in an amount by weight between 0.1% and 10% based on the total weight of the stock formulation in order to obtain a dilute formulation, and
- deposit the dilute formulation on the part in order to obtain the coating.

This process thus makes it possible to obtain a sol-gel coating which provides anticorrosive performance to metal alloys (notably based on aluminum, steel or magnesium), in which are incorporated conductive nanowires (based on silver) that confer electrical conductivity to the coating. This coating also meets the specifications of current chemical conversion treatments based on hexavalent chromium. Particular applications include the treatment of entire parts or the local retouching of anodized surfaces in the event of impact or local stripping.

Certain preferred but non-limiting features of the above-described process are as follows, taken individually or in combination:
- the conductive nanowires comprise silver nanowires, carbon nanowires and/or copper nanowires,
- the conductive nanowires comprise silver nanowires, the suspension of silver nanowires being produced by centrifugation of a suspension of nanowires and silver particles at a speed between 2000 and 6000 revolutions per minute,
- the suspension of silver nanowires is obtained in accordance with the following sub-steps: dissolve polyvinyl pyrrolidone in ethylene glycol to obtain a solution, heat the solution thus obtained at a temperature between 100° C. and 160° C., and, after temperature stabilization, add a solution of sodium chloride and iron(II) acetylacetonate, then add a solution of silver nitrate in ethylene glycol,
- the alcoholic solution of aminosilane comprises isopropanol,
- a concentration of the alcoholic solution of hydrolyzed epoxysilane and a concentration of the alcoholic solution of hydrolyzed aminosilane is about 0.1 mol/L,
- the stock formulation further comprises fluorosilane, at a molar concentration between 0.5% and 5% based on the silicon derived from the epoxysilane and from the aminosilane and/or from the nanometric silica, at a molar concentration between 1% and 5% based on the silicon derived from the epoxysilane and from the aminosilane,
- the stock formulation further comprises a dye at a weight concentration between 0.5% and 5% based on the dry weight of the stock formulation,
- the process further comprises, prior to deposition of the coating, a step of stripping the part and/or a step of pretreating the part with an adhesion promoter,
- the process further comprises, after the step of deposition of the coating, a step of polymerization of the part at a temperature between 80° C. and 150° C., preferably between 80° C. and 120° C.,
- in the stock formulation, the conductive nanowires have an aspect ratio between 1 and 100, and/or
- the deposition is carried out by spraying the dilute formulation onto the part, by dip-coating the part in the dilute formulation or by robotic means.

According to a second aspect, the invention also proposes a metal alloy part comprising a coating obtained according to a treatment process as described above and having a coating thickness between 0.5 and 5 microns.

Certain preferred but non-limiting features of the above-described part are as follows, taken individually or in combination:
- a constituent material of the part comprises an aluminum alloy, an iron alloy or a magnesium alloy, and/or
- the coating comprises silver nanowires.

BRIEF DESCRIPTION OF THE DRAWINGS

Other features, aims and advantages of the present invention will become more readily apparent by reading the following detailed description and referring to the single appended figure, given by way of non-limiting examples, which is a flow chart illustrating the steps of a process for treating a part in accordance with the invention.

DETAILED DESCRIPTION OF AN EMBODIMENT

The invention proposes a treatment process S for a metal alloy part in order to coat same with a coating having good corrosion resistance, good electrical conductivity, good paint adhesion and good fluid resistance. If necessary, the coating must also be able to be colored so as to be visible by an operator.

For example, in the case of an aluminum alloy part, the coating must endow the part with the following properties:
- not more than 2.5 pits per square decimeter after exposure to salt spray in accordance with standard ASTM B 117 or ISO 9227 for 168 hours in the case of an immersion process, and for 72 hours in the case of a retouching process;
- thermal conductivity meeting or exceeding the requirements of standard MIL-DTL-81706;
- paint adhesion to the coating obtained of class 0/1 dry, and class 1/2 at most after immersion in fluids; and
- resistance to fluids (water, hydraulic fluids, fuel, deicer, solvents, etc.).

To this end, the treatment process S for a metal alloy part comprises the following steps:
- produce (step S1) a stock formulation by mixing, in equal molar parts of silicon, an alcoholic solution of hydrolyzed epoxysilane and an alcoholic solution of hydrolyzed aminosilane,
- mix (step S2) the stock formulation with a suspension comprising conductive nanowires in an amount by weight between 0.1% and 10% based on the dry weight of the stock formulation to obtain a dilute formulation, and
- deposit (step S3) the dilute formulation on the part to obtain the coating.

More precisely, during the first step S1, a stock formulation is obtained by mixing, in equal molar parts of silicon, an alcoholic solution of hydrolyzed epoxysilane and an alcoholic solution of hydrolyzed aminosilane.

In an embodiment, the alcoholic solution of hydrolyzed aminosilane may comprise isopropanol.

In an exemplary embodiment, two solutions whose quantities of inputs can be measured can be prepared to obtain the stock formulation. To this end, a first 0.1 mole solution of epoxysilane in isopropanol (IP) can be prepared by weighing 24.622 g of 2-(3,4-epoxycyclohexyl)ethyltrimethoxysilane (molar mass 246.22 g·mol$^{-1}$). Next, 769.778 g of isopropanol (IP) and 0.3 moles of water (i.e., 5.4 g) are then added to hydrolyze the three alkoxy functions of epoxysilane. The first solution is then placed in a closed bottle in a 50° C. oven for 12 hours. The same procedure is then followed with aminosilane, for example by weighing 3-N,N-dimethylaminopropyl)trimethoxysilane. Two solutions containing equal volumes of the same amount of silicon are thus obtained.

The degree of hydrolysis of the alcoholic solution of epoxysilane and of the alcoholic solution of aminosilane can be adjusted according to the anticorrosive properties sought for the metal alloy part and/or to the amount of conductive nanowires. For example, if the surface onto which the coating is deposited is hydrophobic, such as a stripped aluminum surface, solutions having undergone only one or two hydrolyses may be preferred.

The thickness of the coating obtained using the treatment process S depends on the viscosity of the stock formulation.

For example, the viscosity of the stock formulation can be adjusted by varying the dilution of the solvent of the alcoholic solution of aminosilane.

The concentrations of each of the two parts of the stock formulation can for example be about 0.1 mole/L. The two solutions are then mixed in equal molar parts of silicon to give the stock formulation.

Optionally, a fluorosilane can be added to the stock formulation at a molar concentration between 0.5% and 5% (based on the molar concentration of the silicon derived from the epoxysilane and from the aminosilane), in order to increase the hydrophobicity of the coating obtained using the process S.

Also optionally, nanometric silica can be added to the stock formulation at a molar concentration between 1% and 5% (based on the silicon derived from the epoxysilane and from the aminosilane) in order to improve the hardness of the coating. As used herein, "nanometric silica" means a silica whose average grain diameter is between 7 and 40 nanometers. Such a silica is sold for example under the trade name AEROSIL®.

To obtain a coating visible to the naked eye by an operator, a synthetic dye, such as a solvent synthetic dye sold under the trade name ORASOL®, may be added to the formulation, at a weight concentration between 0.5% and 5% (based on the total dry weight of the stock formulation).

In the second step S2, a suspension comprising conductive nanowires in an amount by weight between 0.1% and 10% (based on the total dry weight of the stock formulation) is introduced into the stock formulation thus obtained to obtain a dilute formulation.

The amount by weight of conductive nanowires in the suspension can be adjusted according to the electrical conductivity desired for the coating to be obtained on the metal alloy part.

Furthermore, the suspension is preferably based on alcohol.

The conductive nanowires can comprise silver nanowires, carbon nanowires, copper nanowires or a mixture of these nanowires.

Preferably, the conductive nanowires have an aspect ratio between 1 and 100 in order to allow the formation of a stable suspension in the dilute formulation before the deposition step S3.

The conductive nanowires can be synthesized in a conventional manner.

Examples of silver nanowire synthesis can be found in the following publications: Highly Flexible Transparent Film Heaters Based on Random Networks of Silver Nanowires, Caroline Celle, Céline Mayousse, Eléonore Moreau, Henda Basti, Alexandre Carella, and Jean-Pierre Simonato, Nano Res. 2012, 5(6): 427-433; Fabrication of Silver Nanowire Transparent Electrodes at Room Temperature, Takehiro Tokuno, Masaya Nogi ( ) Makoto Karakawa, Jinting Jiu, Thi Thi Nge, Yoshio Aso, and Katsuaki Suganuma, Nano Res. 2011, 4(12): 1215-1222; Scalable Coating and Properties of Transparent, Flexible, Silver Nanowire Electrodes, Liangbing Hu, Han Sun Kim, Jung-Yong Lee, Peter Peumans, and Yi Cui, ACSnano VOL. 4■ NO. 5 ■ 2955-2963 ■ 2010; Silver nanowire-based transparent, flexible, and conductive thin film, Cai-Hong Liu, Xun Yu, Nanoscale Research Letters 2011, 6:75; Ag-nanowire films coated with ZnO nanoparticles as a transparent electrode for solar cells, Frederik S. F. Morgenstern, Dinesh Kabra, Sylvain Massip, Thomas J. K. Brenner, Philip E. Lyons et al., Appl. Phys. Lett. 99, 183307 (2011); doi: 10.1063/1.3656973.

If necessary, these silver nanowire synthesis processes can be adapted to obtain a transparent coating (with only the optionally-added dye giving the coating a colored appearance).

An exemplary silver nanowire synthesis process can be carried out as follows:

(i) dissolve about 0.2 g of polyvinyl pyrrolidone (PVP) in 20 g to 30 g of ethylene glycol then 200 to 600 mg of silver nitrate in solution in ethylene glycol. Preferably, silver nitrate is added only after heating the solution to the synthesis temperature and stabilizing said temperature. Optionally, iron acetylacetonate can be added to obtain silver nanowires having a greater length (10 μm) and thus a higher aspect ratio.

(ii) heat the solution thus obtained to a temperature between 100° C. and 160° C. for a period between 10 minutes and 60 minutes. A suspension of silver nanowires is thus obtained.

(iii) allow the suspension to cool.

(iv) centrifuge the suspension at a speed between 2000 rpm (209.4 rad/s) and 6000 rpm (628.3 rad/s). The silver nanowires, being the most massive elements, form the centrifugation pellet at the bottom of the centrifugation device, while the nanoparticles remain in suspension. It then suffices to remove the supernatant and to wash the pellet several times with an alcohol in order to collect the silver nanowires.

It should be noted that the exemplary synthesis process described here is easily adaptable to a larger scale.

In the third step S3, the dilute formulation thus obtained is deposited on the metal alloy part to form a coating. The deposition can be carried out by spray-coating (sometimes called thermal spray-coating) the dilute formulation, by dip-coating the part in the dilute formulation, or by spraying using a robot.

The choice of the deposition technique depends in particular on the shape of the metal alloy part to be coated and on the number of parts to be produced. For example, for parts with a simple shape, dip-coating and spray-coating can be considered. On the other hand, for parts with a complex geometry (presence of through-holes, sharp angles, etc.), spraying using a robot may be preferred in order to allow the dilute formulation to flow efficiently by rotation and/or translation of the part relative to the application robot.

Optionally, the aluminum part surface to be coated can be stripped and/or pretreated with an adhesion promoter such as iron carboxylate or aminosilane in high dilution, before the deposition step S3.

In a fourth step S4, the coating thus formed on the metal alloy part is then polymerized at a temperature between 80° C. and 150° C. Preferably, when the metal alloy is based on aluminum, the polymerization temperature remains below 120° C. in order not to alter the mechanical properties of the aluminum alloy, especially when the treated part is hardened or rolled. Conduction between the metal alloy forming the metal part and the coating is obtained by percolation between the conductive nanowires and the surface of the metal part.

The treatment process S thus makes it possible to coat a metal alloy part with a coating having good mechanical, anticorrosive and conductive properties, good paint adhesion and good fluid resistance. The surface area of the part coated with this coating can vary from 1.7 $m^2$ to 5 $m^2$ per liter of dilute formulation comprising the conductive nanowires, depending on the dilution chosen for said dilute formulation. When the stock formulation comprises a dye, the coating formed on the part is also visible to the naked eye.

It should be noted that gelation is produced by the formation of metal-oxygen-metal bonds in the liquid, called sol, which is transformed into a pseudo solid, called gel. In our more specific case, it is the Si—O—Si bonds which occur but under the effect of evaporation of the solvent and of the temperature supplying the energy for the formation of these bonds.

Finally, adjusting the dilution of the stock formulation (and in particular of the alcoholic solution of aminosilane) makes it possible to form a coating having a thickness between 0.5 and 5 microns.

Example

A coating of an aluminum alloy part that can be used in the field of aeronautics can, for example, be obtained as follows. Here, the aluminum alloy is a 2000 series alloy having the reference number 2024-T351-215.

In the first step S1, the stock formulation is obtained by mixing 4.5 g of an alcoholic solution of hydrolyzed epoxysilane (degree of hydrolysis between 1.5 and 3) with 3.59 g of an alcoholic solution of hydrolyzed aminosilane (degree of hydrolysis between 1.5 and 3), each having a concentration of 0.1 mole/L. To this formulation are added:

between 0.1 and 0.6 g of fluorosilane, 1.44 g of nanometric silica with aminosilane (10% by weight $SiO_2$) (for example the nanometric silica AEROSIL® 200) and 0.100 g of ORASOL® dye (for example ORASOL® blue BL)

3.98 g of isopropanol to adjust the viscosity of the formulation.

In the second step S2, a suspension comprising 30 mg to 150 mg of silver nanowire having an aspect ratio between 5 and 60, for example about 30 on average, is introduced into the stock formulation thus obtained. Here, the silver nanowires were obtained by successively dissolving about 0.2 grams of polyvinyl pyrrolidone (PVP) having a molar mass of 55,000 g·mol$^{-1}$ (this parameter influencing nanowire length and diameter) in 23 g of ethylene glycol and then heating to 130° C. After temperature stabilization, 124 μL of sodium chloride (NaCl) solution (100 mM) and 833 μL of iron(II) acetylacetonate (2.2 mM) are added. Here, the sodium chloride and the iron acetylacetonate are in solution in ethylene glycol. After 10 minutes, silver nitrate ($AgNO_3$) solution (comprising 0.83 g of $AgNO_3$ dissolved in 4.2 mL of ethylene glycol) is added and allowed to react for 60 to 180 minutes. After cooling, the suspension is centrifuged at a speed between 2000 rad/s and 6000 rad/s in order to collect the silver nanowires.

In the third step S3, the aluminum part surface to be coated is stripped and then the dilute formulation thus obtained is deposited on the metal alloy part by spray-coating to form a coating.

In the fourth step S4, the coating thus formed on the metal alloy part is polymerized at a temperature of 120° C. for 1 hour.

A coating having the following properties is thus obtained:

Pull-off adhesion greater than 7 MPa,
Cross-cut adhesion: 0 under the ISO standard,
Pencil test >6H,
Sclerometer: 8 N
Roughness ($R_a$): 0.4 to 0.7 μm The volume of dilute formulation comprising silver nanowires required to cover a 1-square-meter surface is between 1 L and 5 L, for a coating thickness of the order of 1 to 5 microns.

The invention claimed is:

1. A treatment process for a metal alloy part comprising the following steps:

produce a stock formulation by mixing, in equal molar parts of silicon, an alcoholic solution of hydrolyzed epoxysilane and an alcoholic solution of hydrolyzed aminosilane, mix the stock formulation with a suspension comprising conductive nanowires in an amount by weight between 0.1% and 10% based on the total weight of the stock formulation to obtain a dilute formulation, and deposit the dilute formulation on the part to obtain the coating, wherein the stock formulation further comprises fluorosilane, at a molar concentration between 0.5% and 5% based on the silicon derived from the epoxysilane and from the aminosilane and/or from the nanometric silica, at a molar concentration between 1% and 5% based on the silicon derived from the epoxysilane and from the aminosilane.

2. The process according to claim 1, wherein the conductive nanowires comprise silver nanowires, carbon nanowires and/or copper nanowires.

3. The process according to claim 1, wherein the conductive nanowires comprise silver nanowires, the suspension of silver nanowires being produced by centrifugation of a suspension of nanowires and silver particles at a speed between 2000 and 6000 revolutions per minute.

4. The process according to claim 3, wherein the suspension of silver nanowires is obtained in accordance with the following substeps:

dissolve polyvinyl pyrrolidone in ethylene glycol to obtain a solution, heat the solution thus obtained to a temperature between 100° C. and 160° C., and after temperature stabilization, add a solution of sodium chloride and iron(II) acetylacetonate, then add a solution of silver nitrate in ethylene glycol.

5. The process according to claim 1, wherein the alcoholic solution of aminosilane comprises isopropanol.

6. The process according to claim 1, wherein a concentration of the alcoholic solution of hydrolyzed epoxysilane and a concentration of the alcoholic solution of hydrolyzed aminosilane is about 0.1 mol/L.

7. The process according to claim 1, wherein the stock formulation further comprises a dye at a weight concentration between 0.5% and 5% based on the dry weight of the stock formulation.

8. The process according to claim 1, further comprising, prior to the deposition step of the coating, a step of stripping the part and/or a step of pretreating the part with an adhesion promoter.

9. The process according to claim 1, further comprising, after the deposition step of the coating, a step of polymerization of the part at a temperature between 80° C. and 150° C.

10. The process according to claim 1, wherein, in the stock formulation, the conductive nanowires have an aspect ratio between 1 and 100.

11. The process according to claim 1, wherein the deposition step is carried out by spraying the dilute formulation onto the part, by dipcoating the part in the dilute formulation or by robotic means.

12. A metal alloy part, characterized in that it comprises a coating obtained according to a treatment process according to claim 1, having a coating thickness between 0.5 and 5 microns.

13. The part according to claim 12, wherein a constituent material of the part comprises an aluminum alloy, an iron alloy or a magnesium alloy.

14. The part according to claim 12, wherein the coating comprises silver nanowires.

15. The process according to claim 9, wherein the step of polymerization of the part is performed at a temperature between 80° C. and 120° C.

* * * * *